(12) United States Patent
Bareiss

(10) Patent No.: US 10,443,846 B2
(45) Date of Patent: Oct. 15, 2019

(54) COMBUSTOR THERMAL SHIELD FABRICATION METHOD

(71) Applicant: UNITED TECHNOLOGIES CORPORATION, Hartford, CT (US)

(72) Inventor: Edward R. Bareiss, Stafford Springs, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 506 days.

(21) Appl. No.: 15/134,511

(22) Filed: Apr. 21, 2016

(65) Prior Publication Data

US 2017/0307216 A1     Oct. 26, 2017

(51) Int. Cl.
| | | |
|---|---|---|
| *F23R 3/00* | (2006.01) | |
| *B23P 15/00* | (2006.01) | |
| *F23R 3/06* | (2006.01) | |
| *F23M 5/04* | (2006.01) | |

(52) U.S. Cl.
CPC ............ *F23R 3/002* (2013.01); *B23P 15/008* (2013.01); *F23M 5/04* (2013.01); *F23R 3/06* (2013.01); *F23R 2900/00018* (2013.01); *F23R 2900/03042* (2013.01); *F23R 2900/03045* (2013.01); *Y02T 50/675* (2013.01)

(58) Field of Classification Search
CPC .. F23R 3/002; F23R 3/06; F23R 2900/00018; B23P 15/008; B33Y 80/00; B33Y 99/00
See application file for complete search history.

(56) References Cited

U.S. PATENT DOCUMENTS

| | | | | |
|---|---|---|---|---|
| 4,302,941 A | * | 12/1981 | DuBell | F23R 3/002 |
| | | | | 60/757 |
| 4,628,694 A | * | 12/1986 | Kelm | B21D 35/00 |
| | | | | 60/752 |
| 4,944,151 A | * | 7/1990 | Hovnanian | F23R 3/002 |
| | | | | 60/752 |
| 5,501,071 A | * | 3/1996 | Ansart | F02K 1/822 |
| | | | | 60/800 |

(Continued)

FOREIGN PATENT DOCUMENTS

| | | |
|---|---|---|
| EP | 2873921 | 5/2015 |
| WO | 2015057304 | 4/2015 |

(Continued)

OTHER PUBLICATIONS

EP Search Report dated Sep. 20, 2017 in EP Application No. 17167410.4.

*Primary Examiner* — Carlos A Rivera
(74) *Attorney, Agent, or Firm* — Snell & Wilmer, L.L.P.

(57) ABSTRACT

A method of fabricating a combustor thermal shield comprising a combustor panel, a cooling feature, and an attachment feature, the combustor thermal shield to be used in a gas turbine engine combustor, includes shaping a sheet of material used to form the combustor panel. The method also includes additively manufacturing the cooling feature onto the sheet of material forming the combustor panel. The method also includes attaching the attachment feature to the sheet of material forming the combustor panel. The method also includes curving the sheet of material forming the combustor panel to achieve a curve profile according to a design of the gas turbine engine combustor.

17 Claims, 5 Drawing Sheets

(56) References Cited

U.S. PATENT DOCUMENTS

| | | | |
|---|---|---|---|
| 8,910,378 B2* | 12/2014 | Kinstler | B23P 6/002 |
| | | | 29/889.1 |
| 2014/0130501 A1* | 5/2014 | Clemen | F23R 3/00 |
| | | | 60/722 |
| 2014/0021604 A1 | 8/2014 | Hanson | |
| 2014/0216042 A1* | 8/2014 | Hanson | F23R 3/06 |
| | | | 60/754 |
| 2014/0238031 A1* | 8/2014 | Okita | F23R 3/06 |
| | | | 60/754 |
| 2015/0128602 A1* | 5/2015 | Clemen | F23R 3/002 |
| | | | 60/754 |
| 2015/0165547 A1* | 6/2015 | Lin | B23P 15/008 |
| | | | 60/752 |
| 2016/0016230 A1* | 1/2016 | Campomanes | C04B 35/638 |
| | | | 264/118 |
| 2016/0033129 A1* | 2/2016 | Burd | F23R 3/002 |
| | | | 60/752 |
| 2016/0109130 A1* | 4/2016 | Stastny | F23R 3/04 |
| | | | 60/755 |
| 2016/0245519 A1* | 8/2016 | Burd | F23R 3/002 |
| 2016/0251970 A1* | 9/2016 | Strock | F01D 11/125 |
| | | | 428/164 |
| 2017/0234140 A1* | 8/2017 | Bunker | F01D 5/187 |
| | | | 415/208.1 |

FOREIGN PATENT DOCUMENTS

| | | | | |
|---|---|---|---|---|
| WO | WO2015050706 A1 * | 4/2015 | | F01D 11/08 |
| WO | 2015069466 | 5/2015 | | |

\* cited by examiner

COMBUSTOR THERMAL SHIELD FABRICATION METHOD

FIELD

The present disclosure relates to a combustor of a gas turbine engine and, more particularly, to a method of fabricating combustor thermal shields to be used in the combustor.

BACKGROUND

Gas turbine engines, such as those that power modern commercial and military aircraft, include a fan section to propel the aircraft, a compressor section to pressurize a supply of air from the fan section, a combustor section to burn a hydrocarbon fuel in the presence of the pressurized air, and a turbine section to extract energy from the resultant combustion gases and generate thrust.

Combustors used in these engines rely on panels of combustor thermal shields to guide combustion gases into the turbine. These panels can be curved, thin-walled cast sheets, with a "cold" side for maintaining thermal shield integrity and life, and an opposite "hot" side for guiding and containing the combustion gases.

The nature of conventional annular combustor design calls for both inner diameter ("ID") and outer diameter ("OD") panels as well as a bulkhead panel at the entrance which may or may not be curved, forming an inner and outer diameter wall, between which the combustion gases travel. The resultant assembly typically employs a variety of complex thin-walled castings with a variety of integrally cast attachment and cooling features. Any changes to the design result in costly and time-consuming casting changes.

SUMMARY

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

A method of fabricating a combustor thermal shield to be used in a gas turbine engine combustor is disclosed. The method includes shaping a sheet of material used to form a combustor panel of the combustor thermal shield. The method also includes additively manufacturing a cooling feature onto the sheet of material forming the combustor panel. The method also includes attaching an attachment feature to the sheet of material forming the combustor panel. The method also includes curving the sheet of material forming the combustor panel to achieve a curve profile according to a design of the gas turbine engine combustor.

Any of the foregoing methods may also include treating the sheet of material forming the combustor panel to be a substrate for the cooling feature.

In any of the foregoing methods, the sheet of material comprises a metal alloy.

In any of the foregoing methods, attaching the attachment feature to the sheet of material forming the combustor panel includes creating a hole in the sheet of material forming the combustor panel; inserting at least one of a screw or a bolt through the hole, the at least one of the screw or the bolt forming the attachment feature; and joining the at least one of the screw or the bolt to the sheet of material forming the combustor panel.

In any of the foregoing methods, the joining comprises at least one of brazing, welding, soldering, or interference fitting.

In any of the foregoing methods, a hot forming press curves the combustor panel.

In any of the foregoing methods, a cold forming press curves the combustor panel.

In any of the foregoing methods, the curving is performed after additively manufacturing the cooling feature and after attaching the attachment feature.

In any of the foregoing methods, the curving is performed prior to additively manufacturing the cooling feature and prior to attaching the attachment feature.

Any of the foregoing methods may also include creating a cooling hole in the sheet of material forming the combustor panel.

A combustor thermal shield for a gas turbine engine combustor is disclosed. The combustor thermal shield includes a combustor panel formed from a sheet of material and curved to achieve a curve profile according to a design of the gas turbine engine combustor. The combustor thermal shield also includes an additively manufactured cooling feature formed onto the combustor panel. The combustor thermal shield also includes an attachment feature attached to the combustor panel by creating a hole in the combustor panel, inserting at least one of a screw or a bolt through the hole, and joining the at least one of the screw or the bolt to the combustor panel.

A method of fabricating a combustor thermal shield to be used in a gas turbine engine combustor is disclosed. The method includes shaping a sheet of material used to form a combustor panel of the combustor thermal shield. The method also includes separately additively manufacturing a cooling feature. The method also includes joining the cooling feature onto the sheet of material forming the combustor panel. The method also includes attaching an attachment feature to the sheet of material forming the combustor panel. The method also includes curving the sheet of material forming the combustor panel to achieve a curve profile according to a design of the gas turbine engine combustor.

In any of the foregoing methods, joining the cooling feature onto the sheet of material forming the combustor panel comprises at least one of brazing, welding, soldering, or interference fitting.

In any of the foregoing methods, the sheet of material comprises a metal alloy.

In any of the foregoing methods, attaching the attachment feature to the sheet of material forming the combustor panel includes creating a hole in the sheet of material forming the combustor panel; inserting at least one of a screw or a bolt through the hole, the at least one of the screw or the bolt forming the attachment feature; and joining the at least one of the screw or the bolt to the sheet of material forming the combustor panel.

In any of the foregoing methods, joining the screw or bolt to the sheet of material comprises at least one of brazing, welding, soldering or interference fitting.

In any of the foregoing methods, curving the panel comprises using a hot forming press.

In any of the foregoing methods, curving the panel comprises using a cold forming press.

In any of the foregoing methods, the curving is performed after additively manufacturing the cooling feature and after attaching the attachment feature.

In any of the foregoing methods, the curving is performed prior to joining the cooling feature and prior to attaching the attachment feature to the sheet of material forming the combustor panel.

BRIEF DESCRIPTION OF THE DRAWINGS

Various features will become apparent to those skilled in the art from the following detailed description of the disclosed, non-limiting, embodiments. The drawings that accompany the detailed description can be briefly described as follows.

DETAILED DESCRIPTION

Figure 1:
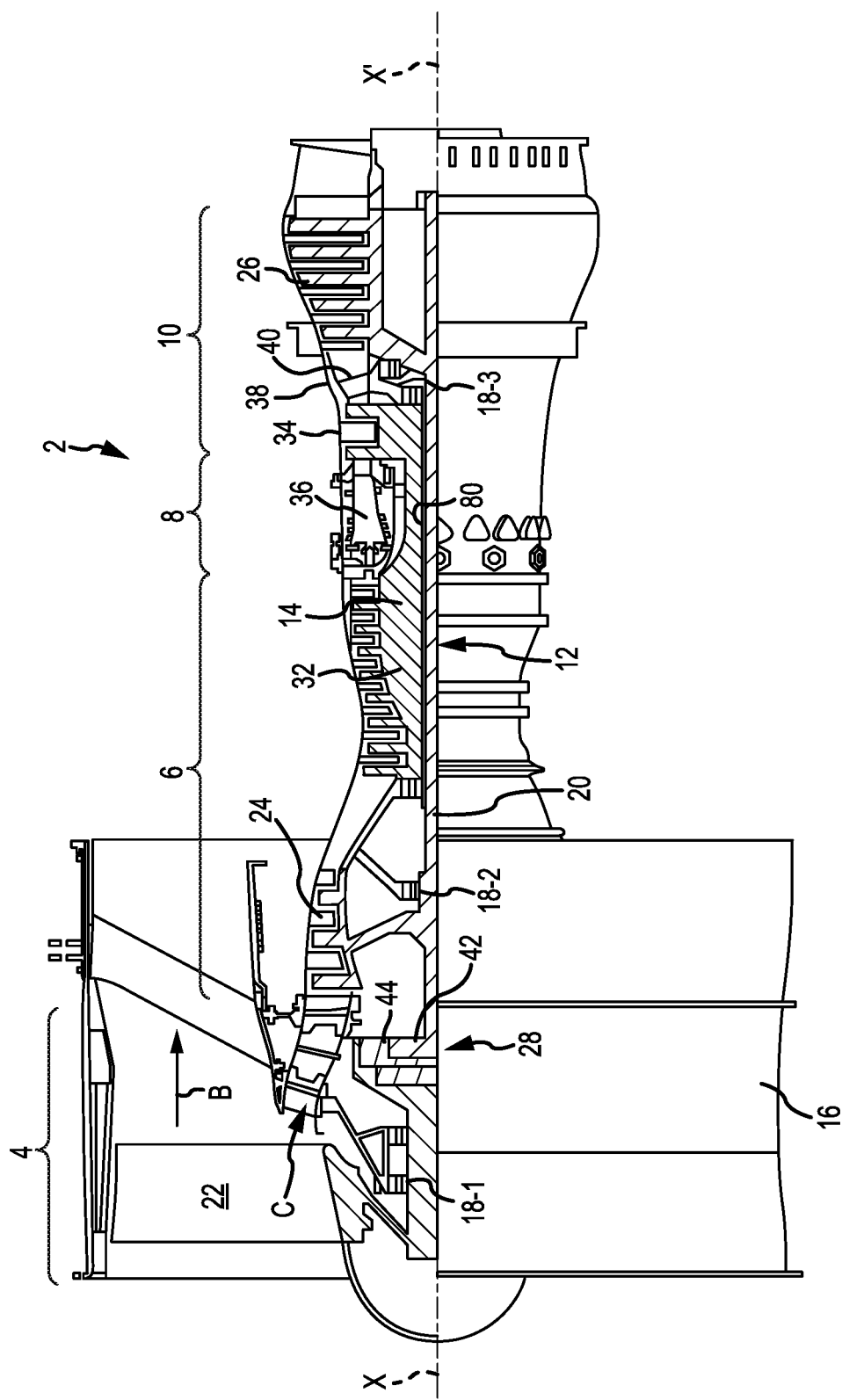
FIG. 1 is a schematic cross-section of a gas turbine engine.

The detailed description of exemplary embodiments herein makes reference to the accompanying drawings, which show exemplary embodiments by way of illustration. While these exemplary embodiments are described in sufficient detail to enable those skilled in the art to practice embodiments of the disclosure, it should be understood that other embodiments may be realized and that logical changes and adaptations in design and construction may be made in accordance with this invention and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step. Surface shading lines may be used throughout the figures to denote different parts but not necessarily to denote the same or different materials.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "axially outward" of a second component means that a first component is positioned at a greater distance in the aft or forward direction away from the longitudinal center of the gas turbine along the longitudinal axis of the gas turbine, than the second component. A first component that is "axially inward" of a second component means that the first component is positioned closer to the longitudinal center of the gas turbine along the longitudinal axis of the gas turbine, than the second component.

A first component that is "radially outward" of a second component means that a first component is positioned at a greater distance away from the engine central longitudinal axis, than the second component. A first component that is "radially inward" of a second component means that the first component is positioned closer to the engine central longitudinal axis, than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor.

The combustor section may have an annular wall assembly having inner and outer shells that support respective inner and outer heat shielding liners. The liners may be comprised of a plurality of heat shields or panels that together define an annular combustion chamber. An annular cooling cavity is defined between the respective shells and liners for supplying cooling air to an opposite hot side of the panels through a plurality of strategically placed effusion holes. Impingement holes are located in the shell for supply cooling air from an outer air plenum and into the cavity. The effusion holes are generally orientated to create a protective blanket, or, air film over the hot side of the panels, thereby protecting the panels from the hot combustion gases in the chamber.

In various embodiments and with reference to FIG. 1, an exemplary gas turbine engine 2 is provided. Gas turbine engine 2 may be a two-spool turbofan that generally incorporates a fan section 4, a compressor section 6, a combustor section 8 and a turbine section 10. Alternative engines may include, for example, an augmentor section among other systems or features. In operation, fan section 4 can drive air along a bypass flow-path B while compressor section 6 can drive air along a core flow-path C for compression and communication into combustor section 8 then expansion through turbine section 10. Although depicted as a turbofan gas turbine engine 2 herein, it should be understood that the concepts described herein are not limited to use with turbofans as the teachings may be applied to other types of turbine engines including three-spool architectures.

Gas turbine engine 2 may generally comprise a low speed spool 12 and a high speed spool 14 mounted for rotation about an engine central longitudinal axis X-X' relative to an engine static structure 16 via several bearing systems 18-1, 18-2, and 18-3. It should be understood that various bearing systems at various locations may alternatively or additionally be provided, including for example, bearing system 18-1, bearing system 18-2, and bearing system 18-3.

Low speed spool 12 may generally comprise an inner shaft 20 that interconnects a fan 22, a low pressure compressor section 24 (e.g., a first compressor section) and a low pressure turbine section 26 (e.g., a first turbine section). Inner shaft 20 may be connected to fan 22 through a geared architecture 28 that can drive the fan 22 at a lower speed than low speed spool 12. Geared architecture 28 may comprise a gear assembly 42 enclosed within a gear housing 44. Gear assembly 42 couples the inner shaft 20 to a rotating fan structure. High speed spool 14 may comprise an outer shaft 30 that interconnects a high pressure compressor section 32 (e.g., second compressor section) and high pressure turbine section 34 (e.g., second turbine section). A combustor 36 may be located between high pressure compressor section 32 and high pressure turbine section 34. A mid-turbine frame 38 of engine static structure 16 may be located generally between high pressure turbine section 34 and low pressure turbine section 26. Mid-turbine frame 38 may support one or more bearing systems 18 (such as 18-3) in turbine section 10. Inner shaft 20 and outer shaft 30 may be concentric and rotate via bearing systems 18 about the engine central longitudinal axis X-X', which is collinear with their longitudinal axes. As used herein, a "high pressure" compressor or turbine experiences a higher pressure than a corresponding "low pressure" compressor or turbine.

The core airflow C may be compressed by low pressure compressor section 24 then high pressure compressor section 32, mixed and burned with fuel in combustor 36, then expanded over high pressure turbine section 34 and low pressure turbine section 26. Mid-turbine frame 38 includes airfoils 40, which are in the core airflow path. Turbines 26, 34 rotationally drive the respective low speed spool 12 and high speed spool 14 in response to the expansion.

Gas turbine engine 2 may be, for example, a high-bypass geared aircraft engine. In various embodiments, the bypass ratio of gas turbine engine 2 may be greater than about six (6). In various embodiments, the bypass ratio of gas turbine engine 2 may be greater than ten (10). In various embodiments, geared architecture 28 may be an epicyclic gear train, such as a star gear system (sun gear in meshing engagement with a plurality of star gears supported by a carrier and in meshing engagement with a ring gear) or other gear system. Geared architecture 28 may have a gear reduction ratio of greater than about 2.3 and low pressure turbine section 26 may have a pressure ratio that is greater than about 5. In various embodiments, the bypass ratio of gas turbine engine 2 is greater than about ten (10:1). In various embodiments, the diameter of fan 22 may be significantly larger than that of the low pressure compressor section 24, and the low pressure turbine section 26 may have a pressure ratio that is greater than about 5:1. Low pressure turbine section 26 pressure ratio may be measured prior to inlet of low pressure turbine section 26 as related to the pressure at the outlet of low pressure turbine section 26 prior to an exhaust nozzle. It should be understood, however, that the above parameters are exemplary of various embodiments of a suitable geared architecture engine and that the present disclosure contemplates other turbine engines including direct drive turbofans.

In various embodiments, the next generation of turbofan engines may be designed for higher efficiency, which may be associated with higher pressure ratios and higher temperatures in the high speed spool 14. These higher operating temperatures and pressure ratios may create operating environments that may cause thermal loads that are higher than thermal loads conventionally encountered, which may shorten the operational life of current components. In various embodiments, operating conditions in high pressure compressor section 32 may be approximately 1400° F. (approximately 760° C.) or more, and operating conditions in combustor 36 may be higher.

In various embodiments, combustor section 8 may comprise one or more combustor 36. As mentioned, the core airflow C may be compressed, then mixed with fuel and ignited in the combustor 36 to produce high speed exhaust gases.

Combustor 36 is thus exposed to high temperature flame and/or gases during the operation of the gas turbine engine 2. As such, and with reference to FIGS. 1 and 2, one or more combustor thermal shields 108 may be positioned in combustor 36 to protect various features of the combustor 36 from the high temperature flame and/or gases. A combustor 36 may comprise a combustor chamber 102 defined by a combustor outer shell 104 and a combustor inner shell 184. The combustor chamber 102 may form a region of mixing of core airflow C and fuel, and may direct the high-speed exhaust gases produced by the ignition of this mixture inside the combustor 36. The combustor outer shell 104 and the combustor inner shell 184 may provide structural support to the combustor 36 and its components. For example, a combustor outer shell 104 and a combustor inner shell 184 may comprise a substantially cylindrical canister portion defining an inner area comprising the combustor chamber 102.

It may be desirable to protect the combustor outer shell 104 and the combustor inner shell 184 from the deleterious effects of high temperatures. One or more combustor thermal shields 108 may be disposed inside the combustor chamber 102 and may provide such protection.

Figure 2:
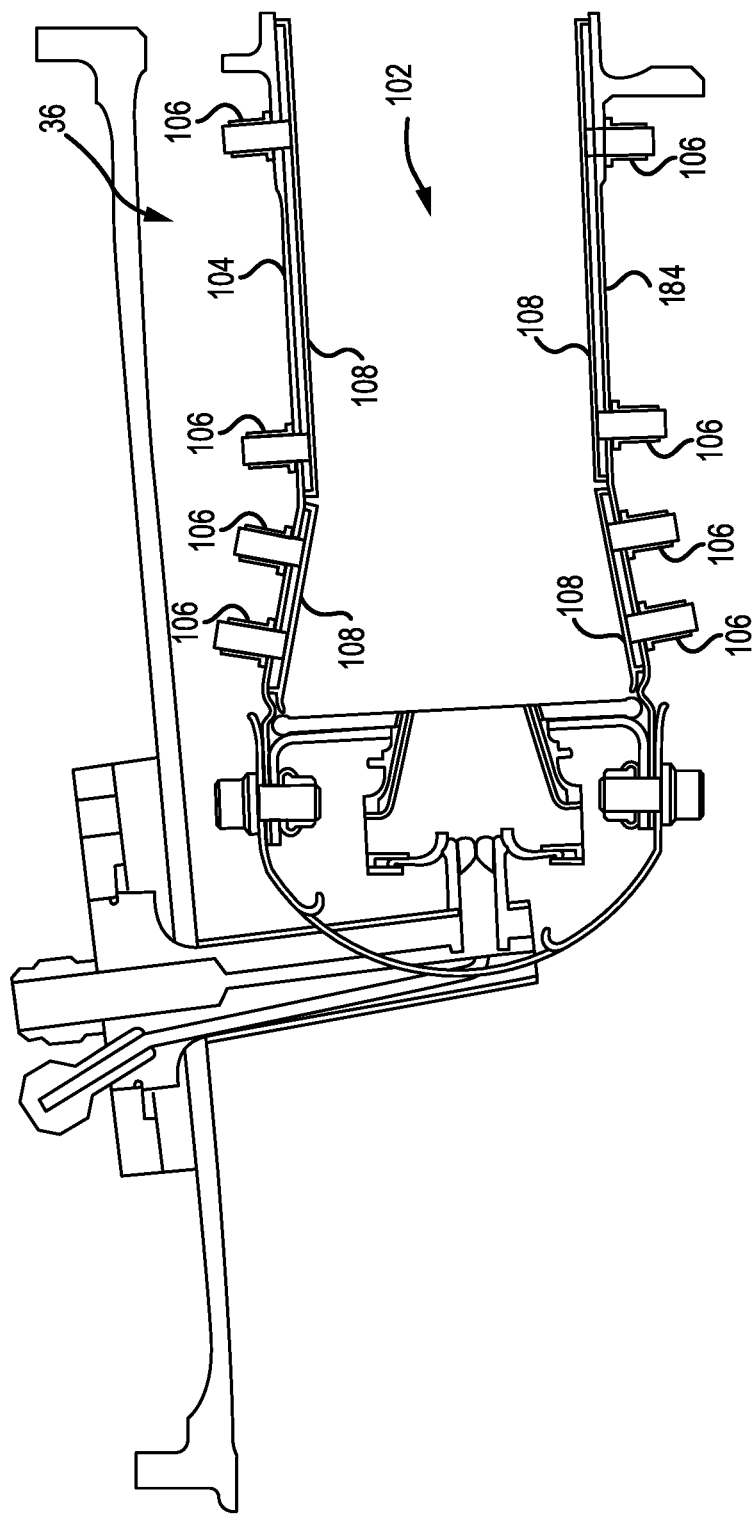
FIG. 2 is a cross-section of a combustor section.
Figure 3:
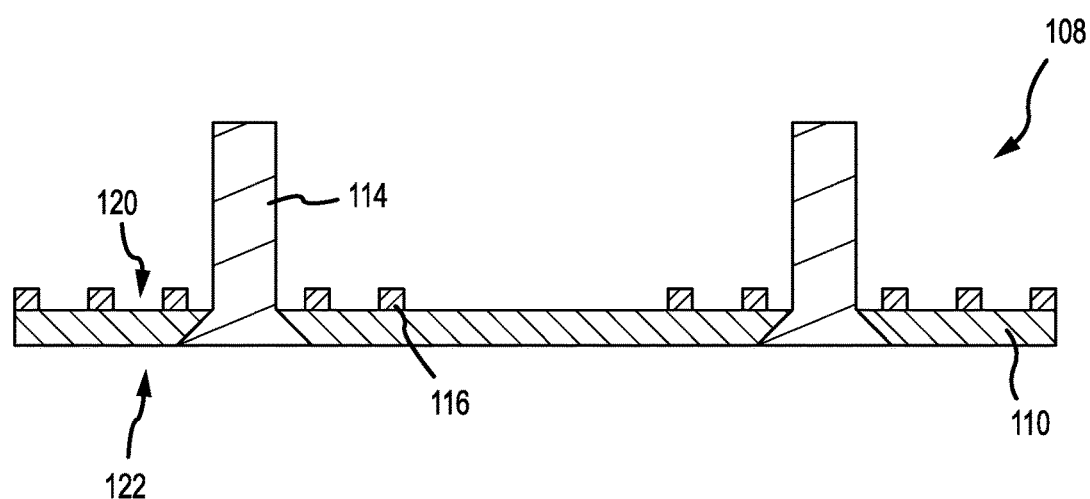
FIG. 3 is a partial cross section of a panel of the combustor section.
Figure 4:
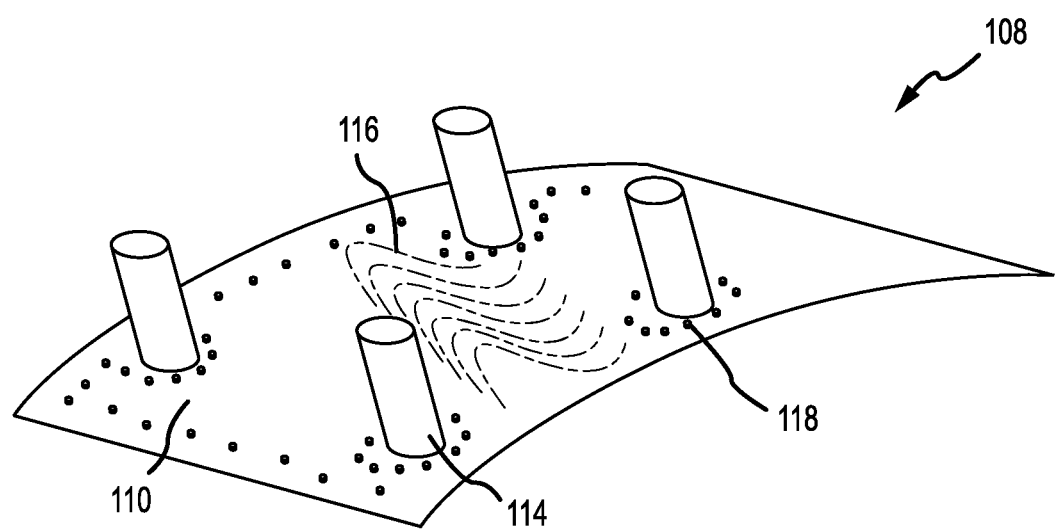
FIG. 4 is a perspective view of a panel of the combustor section.

With reference to FIGS. 2-4, a combustor thermal shield 108 may comprise a partial cylindrical surface section (e.g., may have a cross-section comprising an arc length). One or more combustor thermal shields 108 may be arranged radially inward of the combustor outer shell 104, for example, circumferentially about the inner surface of the combustor outer shell 104. One or more combustor thermal shields 108 may also be arranged radially outward of the combustor inner shell 184. The combustor thermal shields 108 may comprise a variety of materials.

As used herein, "a material deposition process" or an "additive material deposition process" may include at least one of 3D printing, lithography such as stereolithography ("SLA"), various laser sintering processes, or any other appropriate technique or combination of techniques. For example, a combustor thermal shield 108 may be formed by an additive material deposition process wherein materials, including dissimilar materials, such as metal and ceramic, may be mixed according to various ratios and formed into various aspects of a combustor thermal shield 108. Thus, while a combustor thermal shield 108 may comprise a unitary body, various elements of the combustor thermal shield 108 may have various different material compositions.

Turning to FIG. 3, the combustor thermal shields 108 may comprise a combustor panel 110, attachment features 114, and cooling features 116. A combustor panel 110 may be made of a thermal insulator material. The combustor panel 110 may have a partial cylindrical surface section (e.g., may have a cross-section comprising an arc length). The combustor panel 110 may be directly exposed to the heat and/or flame in the combustor chamber 102. Thus, the combustor panel 110 may be made of any suitable heat tolerant material. In this manner, the combustor panel 110 may be resistant to thermal mechanical fatigue, such that cracking and liberation of portions of the combustor panel 110 into the core airflow C may be ameliorated. Accordingly, the combustor thermal shield 108 may be made of a material composition including a metal material, or any suitable heat tolerant material.

The combustor thermal shield 108 may comprise one or more attachment features 114. In various embodiments, the attachment feature 114 is a boss extending radially outward relative to the combustor panel 110. In various embodiments, the attachment feature 114 is a cylindrical boss, such as a threaded pin, or may be a rectangular boss, such as for receiving a clip, or may be any other apparatus whereby the combustor thermal shield 108 is mounted to the combustor outer shell 104 or the combustor inner shell 184. In various embodiments, the attachment feature 114 comprises a threaded stud that extends through a corresponding aperture in the combustor outer shell 104 or the combustor inner shell 184, and is retained in position by an attachment nut 106 disposed outward of the combustor outer shell 104 and torqued so that the attachment feature 114 is preloaded with a retaining force and securely affixes the combustor thermal shield 108 in substantially fixed position relative to the combustor outer shell 104 or the combustor inner shell 184.

The attachment feature 114 may be made of a material composition including a metal material, such as an austenitic nickel-chromium-based alloy or any ductile material sufficiently ductile to withstand the pre-loading exerted by the attachment nut 106.

The combustor thermal shield 108 may further comprise one or more cooling features 116. In various embodiments, the cooling features 116 are pins extending radially outward relative to the combustor panel 110. The cooling features 116 may mechanically contact the inner face of the combustor outer shell 104 or the combustor inner shell 184 so that in response to the attachment nut 106 tightening, a shield spacing distance is maintained between the combustor thermal shield 108 and the combustor outer shell 104 or the combustor inner shell 184.

Typically, the combustor thermal shield 108 is made by casting a metal material to form the combustor panel 110 and the attachment features 114 in a single piece. In various embodiments, the cooling features 116 are also cast as part of the combustor panel 110 along with attachment features 114. While casting the combustor thermal shield 108 may result in achieving a required curved profile in a structurally solid product, if adjustments to the overall design of the arrangement of combustor thermal shields 108 within the combustor 36 are modified, fabricating the adjusted combustor thermal shields 108 by casting may prove to be expensive, both in terms of cost and time. Previously cast combustor thermal shields may not be capable of adjustment, which means adjustments to combustor thermal shield design results in re-casting of the combustor thermal shields 108.

Instead of casting the combustor thermal shields 108, a flat sheet of prefabricated wrought sheet of material may be used to form the combustor panel 110 (as shown in FIG. 3), and later curved (as shown in FIG. 4) to achieve a desired profile according to the design of the combustor 36. The sheet of material may be a commercially available sheet of metal having properties appropriate for use as a combustor panel, such as being heat tolerant and resistant to heat fatigue. In various embodiments, the sheet of metal is made of a nickel based superalloy.

Attachment features 114 may be attached by creating or drilling a hole in the sheet of material to create an aperture. A screw or bolt forming the attachment feature 114 is inserted into the aperture and the screw or bolt is permanently joined to the sheet of material. In various embodiments, the screw or bolt is joined by brazing, welding, soldering, or interference fitting. In various embodiments, the screw or bolt is welded on the side 122 of the combustor panel 110 which will face axially inward when installed in the combustor 36 on the combustor outer shell 104 and axially outward when installed in the combustor 36 on the combustor inner shell 184. In various embodiments, the attachment point of the sheet of material and the screw or bolt is ground down or sanded down to create a substantially flat surface on the "hot side" facing the combustion gases.

Cooling features 116 may be formed on the sheet of material forming the combustor panel 110 using an additive process, to either a flat sheet or a curved sheet. In various embodiments, the cooling features 116 are fabricated separately and bonded to the sheet of material, either to a flat sheet or a curved sheet. For example, the cooling features 116 may be fabricated onto a flat sheet substrate and subsequently bonded, welded, or brazed onto the flat or curved sheet of material onto side 120, which will face axially outward when the combustor thermal shield 108 is installed in the combustor 36 on the combustor outer shell 104 or will face axially inward when the combustor thermal shield 108 is installed in the combustor 36 on the combustor inner shell 184. Likewise, holes may be created when the panel is in a flat or curved state. In various embodiments, the holes are cooling holes 118 formed by drilling or creating holes into the sheet of material forming the combustor panel 110. The holes may also be diffusion or effusion holes, ignitor holes, fuel nozzle holes, combustion holes, or dilution holes of any size and any arrangement.

In various embodiments, the cooling features 116 are formed separately on a separate sheet of material and the separate sheet of material is bonded to the sheet of material forming the combustor panel 110, either to a flat sheet or a curved sheet.

By using a prefabricated, commercially available sheet of metal material, lead times may be reduced from months to days, creating a time savings. In addition, by using prefabricated materials, the cost may also be reduced. While conventional casting techniques may be useful for mature, large scale production, the method described herein removes considerable fabrication time by eliminating the process of casting. Use of commercially available material and direct-bonded additive manufacture increases design speed and process flexibility, making the process many orders of magnitude faster and cheaper than casting.

The method described herein especially permits test-engine or "rig-based" testing to demonstrate multiple design iterations, such as modifications to cooling features, coating types, or both, within a single test. The method described herein also allows scaling of design concepts up or down, to larger or smaller combustors in size, very quickly. Achieving this using casting is impossible, as a cast panel has its shape, curvature, and attachment points fixed.

Figure 5:
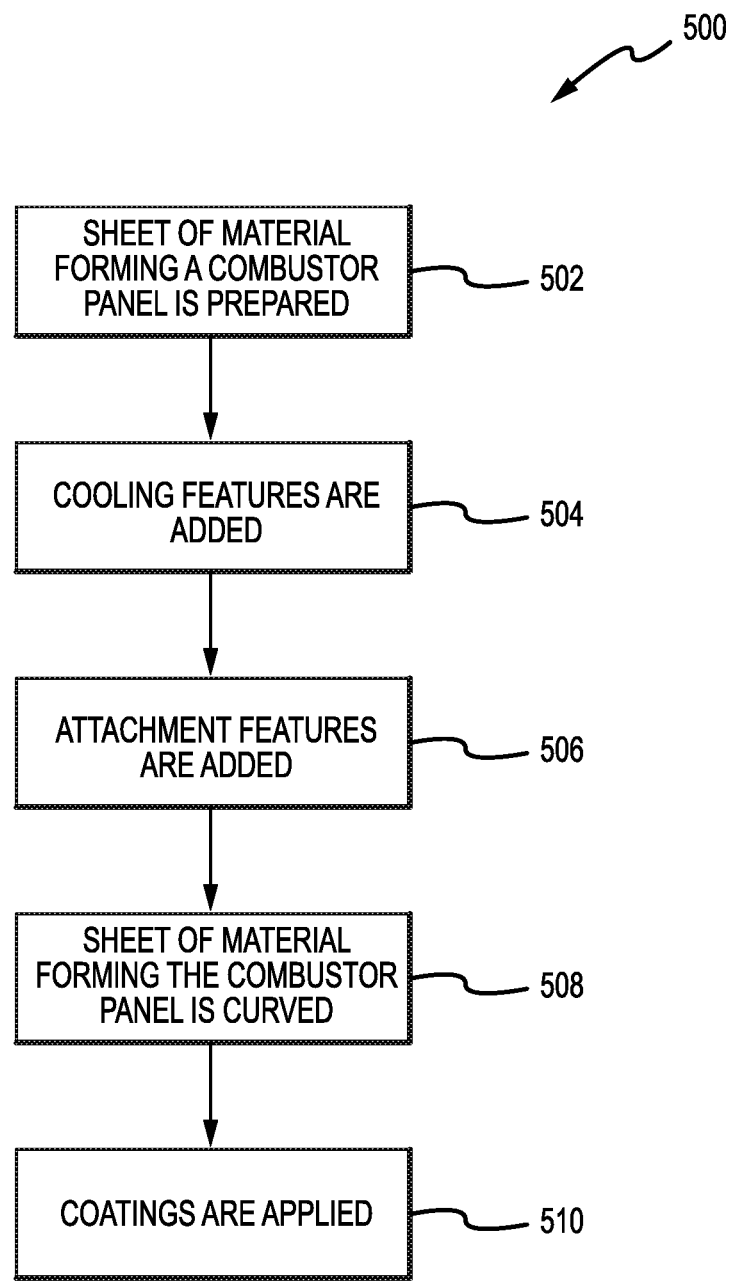
FIG. 5 is a flowchart describing the steps of fabricating a panel of the combustor section, in accordance with various embodiments.

Referring to FIG. 5, an exemplary process 500 is illustrated. A sheet of material is prepared (step 502). In various embodiments, the sheet of material is a metal material, as described herein. In various embodiments, the sheet of material is initially formed into rolls, and a section of the roll to be used in the panel is flattened and may be shaped according to the design. Shaping of the sheet of material forming the panel may be achieved by milling, grinding, laser cutting, waterjet cutting, electrical discharge machining, or any other process to shape or cut the sheet of material. Once flat and shaped, the sheet of material forming the panel may be treated or prepared in order to be a substrate for direct-bonded, additively manufactured cooling features. Treating the sheet of material may include cleaning the sheet of material, priming the sheet of material, chemical etching, or abrasive blasting of the sheet of material. Any combination of the methods of treating the sheet of material may be used.

Cooling features are added to the sheet of material forming the combustor panel (step 504). In various embodiments, cooling features include cooling pins (e.g., cooling features 116), cooling holes (e.g., cooling holes 118), fins, rails, and any other feature used for cooling. In various embodiments, the cooling features are additively manufactured and formed onto the sheet of material forming the combustor panel using additive manufacturing methods. In various embodiments, the additive manufacturing methods include direct laser metal sintering using powders which may be comprised of the same base alloy as the wrought sheet of metal material. In various embodiments, the features are welded, soldered, brazed, or interference fit onto the sheet of material forming the panel.

Attachment features are added to the sheet of material forming the combustor panel (step 506). The attachment features may be attached by drilling holes through the panel, inserting an appropriate screw or bolt forming the attachment feature, and joining the screw or bolt to the sheet of material by brazing, welding, soldering, or interference fitting.

The sheet of material forming the panel is curved according to the design of the combustor (step 508). In various embodiments, the sheet of material forming the panel is curved using a hot forming press or a cool forming press and the curving is performed in a manner such that loading, load rate, temperatures, and other characteristics of the panel are optimized to retain the additively manufactured features by not allowing for dis-bonding or cracking within the additively manufactured features or between the additively manufactured features and the substrate.

By curving the flat panel instead of casting the panel, new panels may be fabricated on a much faster timetable. While the process 500 illustrates adding cooling features in step 504, adding attachment features in step 506 and then curving the panel in step 508, the order is not critical, and may be switched. For example, the attachment features may be attached, the cooling features additively formed, and the panel may then be curved. In another example, the panel may first be curved, then the cooling features and attachment features added, in any order. In another example, one of the attachment features or cooling features are added, the panel is curved, and then the other of the cooling features or attachment features are added.

Coatings are applied to the combustor panel (step 510). In various embodiments, the coatings provide structural support and rigidity for the combustor panel. In various embodiments, the coatings provide thermal resistance and oxidation resistance properties to the combustor panel.

Based on testing results, attachment features and/or cooling features may be added to, removed from, or relocated on the curved combustor panel.

In a routine production environment, cooling and attachment features in cast panels are typically easily damaged, particularly the attachment features. By using the method described herein, the time and cost of replacing the damaged features is significantly reduced. Traditionally, when cooling and attachment features in cast panels are damaged, the entire panel is replaced or performance is affected.

In order to replace a damaged attachment feature attached to a combustor panel, the screw or bolt forming the damaged attachment feature is first removed. Then, a hole in the combustor panel is created. In various embodiments, removal of the screw or bolt forming the damaged attachment feature creates the hole. A new screw or bolt forming the replacement attachment feature is inserted and the new screw or bolt is attached to the combustor panel, as described herein. Also as described herein, the attachment feature addition process may be performed on an already curved combustor panel, so the sheet of material forming the combustor panel is not required to be flattened prior to replacement of the damaged attachment feature.

In order to replace a damaged additively manufactured cooling feature, the damaged cooling feature is first removed from the combustor panel. The combustor panel is prepared to be a substrate for a new additively manufactured cooling feature. The additively manufactured replacement cooling feature is formed on the combustor panel. As described herein, the additive manufacturing process may be performed on a curved combustor panel, so the sheet of material forming the combustor panel is no longer flattened prior to forming of the replacement cooling feature.

While the disclosure is described with reference to exemplary embodiments, it will be understood by those skilled in the art that various changes may be made and equivalents may be substituted without departing from the spirit and scope of the disclosure. In addition, different modifications may be made to adapt the teachings of the disclosure to particular situations or materials, without departing from the essential scope thereof. The disclosure is thus not limited to the particular examples disclosed herein, but includes all embodiments falling within the scope of the appended claims.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35

U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of fabricating a combustor thermal shield to be used in a gas turbine engine combustor, the method comprising:
    shaping a sheet of material used to form a combustor panel of the combustor thermal shield;
    additively manufacturing a cooling feature onto the sheet of material forming the combustor panel;
    attaching an attachment feature to the sheet of material forming the combustor panel; and
    after attaching the attachment feature to the sheet of material forming the combustor panel, curving the sheet of material forming the combustor panel to achieve a curve profile according to a design of the gas turbine engine combustor,
    wherein attaching the attachment feature to the sheet of material forming the combustor panel comprises
        creating a hole in the sheet of material forming the combustor panel;
        inserting at least one of a screw or a bolt through the hole, the at least one of the screw or the bolt forming the attachment feature; and
        joining the at least one of the screw or the bolt to the sheet of material forming the combustor panel by at least one of brazing, welding, or soldering.

2. The method of claim 1, further comprising treating the sheet of material forming the combustor panel to be a substrate for the cooling feature.

3. The method of claim 1, wherein the sheet of material comprises a metal alloy.

4. The method of claim 1, wherein the joining comprises interference fitting.

5. The method of claim 1, wherein a hot forming press curves the combustor panel.

6. The method of claim 1, wherein a cold forming press curves the combustor panel.

7. The method of claim 1, wherein the curving is performed after additively manufacturing the cooling feature and after attaching the attachment feature.

8. The method of claim 1, wherein the curving is performed prior to additively manufacturing the cooling feature and prior to attaching the attachment feature.

9. The method of claim 1, further comprising creating a cooling hole in the sheet of material forming the combustor panel.

10. A method of fabricating a combustor thermal shield to be used in a gas turbine engine combustor, the method comprising:
    shaping a sheet of material used to form a combustor panel of the combustor thermal shield;
    separately additively manufacturing a cooling feature;
    joining the cooling feature onto the sheet of material forming the combustor panel;
    attaching an attachment feature to the sheet of material forming the combustor panel; and
    after attaching the attachment feature to the sheet of material forming the combustor panel, curving the sheet of material forming the combustor panel to achieve a curve profile according to a design of the gas turbine engine combustor,
    wherein attaching the attachment feature to the sheet of material forming the combustor panel comprises
        creating a hole in the sheet of material forming the combustor panel;
        inserting at least one of a screw or a bolt through the hole, the at least one of the screw or the bolt forming the attachment feature; and
        joining the at least one of the screw or the bolt to the sheet of material forming the combustor panel, by at least one of brazing, welding, soldering.

11. The method of claim 10, wherein joining the cooling feature onto the sheet of material forming the combustor panel comprises at least one of brazing, welding, soldering, or interference fitting.

12. The method of claim 10, wherein the sheet of material comprises a metal alloy.

13. The method of claim 10, wherein joining the screw or bolt to the sheet of material comprises interference fitting.

14. The method of claim 10, wherein curving the panel comprises using a hot forming press.

15. The method of claim 10, wherein curving the panel comprises using a cold forming press.

16. The method of claim 10, wherein the curving is performed after additively manufacturing the cooling feature and after attaching the attachment feature.

17. The method of claim 10, wherein the curving is performed prior to joining the cooling feature and prior to attaching the attachment feature to the sheet of material forming the combustor panel.

* * * * *